United States Patent [19]

Krempel

[11] Patent Number: 4,552,534

[45] Date of Patent: Nov. 12, 1985

[54] VISUAL COMMUNICATION SYSTEM DEVICES

[76] Inventor: Ralf Krempel, 2400 Pacific Ave., San Francisco, Calif. 94115

[21] Appl. No.: 637,289

[22] Filed: Aug. 3, 1984

[51] Int. Cl.[4] ............................................. G09B 19/00
[52] U.S. Cl. .................................. 434/170; 434/172; 434/403
[58] Field of Search ........................ 434/170, 172, 403

[56] References Cited

U.S. PATENT DOCUMENTS

| | | | |
|---|---|---|---|
| 1,412,204 | 4/1922 | Derby | 434/172 |
| 3,721,020 | 3/1973 | Martin | 434/170 |
| 3,813,471 | 5/1974 | Dean | 434/170 |
| 3,982,333 | 9/1976 | Farmer | 434/170 |
| 4,345,902 | 8/1982 | Hengel | 434/170 |
| 4,439,160 | 3/1984 | Krempel | 434/170 |
| 4,443,199 | 4/1974 | Sakai | 434/170 |

FOREIGN PATENT DOCUMENTS

| | | | |
|---|---|---|---|
| 1521793 | 3/1968 | France | 434/170 |
| 94162 | 6/1969 | France | 434/170 |
| 2448758 | 10/1980 | France | 434/170 |

Primary Examiner—William H. Grieb

[57] ABSTRACT

The Visual Communication System of the Krempel Code whereby colors are used instead of letters of the common alphabet for world-wide relaying of messages can also utilize in any modern language the Visual Communication System Devices of colored cubes employed on indicated boards or trays, rectangular beltlike color selectors as well as computer displays for communicative purposes.

4 Claims, 6 Drawing Figures

U.S. Patent     Nov. 12, 1985     4,552,534
FIG. 1
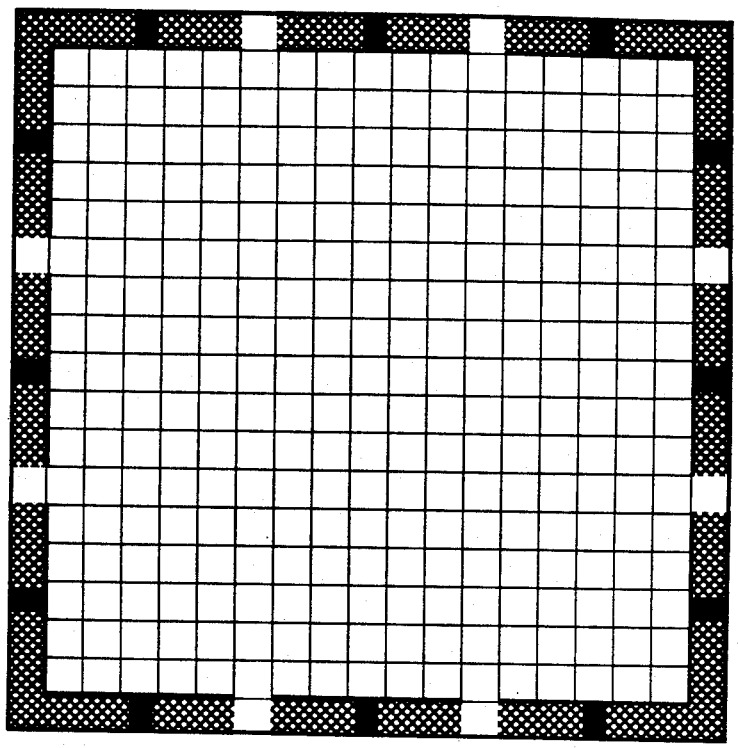
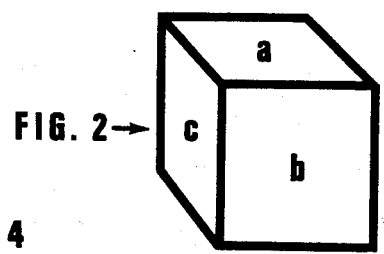
FIG. 2
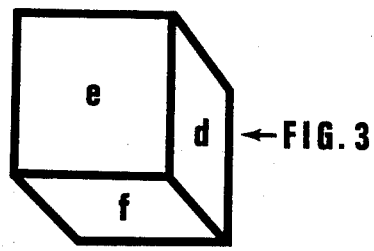
FIG. 3
FIG. 4
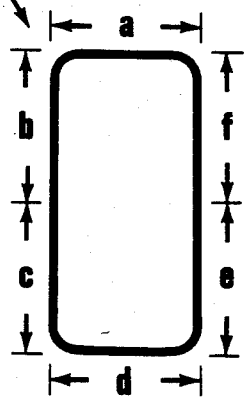
FIG. 5
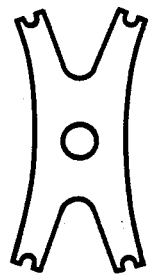
FIG. 6
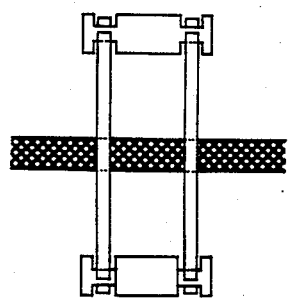

VISUAL COMMUNICATION SYSTEM DEVICES

SUMMARY OF THE INVENTION

The present improvement disclosure of my first patent, U.S. Pat. No. 4,439,160 granted Mar. 27, 1984, Visual Communication System is incorporated into the present application by reference thereto.

Whereas the Krempel Code of the Visual Communication System applies the colored markings for the purpose of reading and conveying messages mainly but not entirely on a two dimensional surface of course the possibility exists for the use of moveable marked objects also in other forms.

First of all is the simple cube which can easily with its plain faces, each of them marked with a different color, in combination with similar marked cubed, be utilized in the framework of the Krempel Code as message carrier means. Those cubes can also be of magnetic material or supplied with colors to glow in the dark.

Even a more complicated cube can be used as a message carrier means. By giving every edge of the cube protuberant projecting rodlike rounded eaves, a sunken appearance of the cube's main faces will be accomplished which in turn can carry markings in different colors or even the usual number of spots in an indented, flat or elevated nature for better viewing. The cube's eaves are having the purpose of providing better tumbling abilities, giving an illuminating base if fashioned in a reflective style which will enable any cube's face to be read under bad lighting conditions or even in the dark, as well as helping the cubes to be fastened snugly in a framework necessary for the combination with other similar cubes to portray messages.

The incorporation of the cubes on or in a subdivided gridlike board or tray with or without a frame, whereon indication marks as guiding principles in helping the forming of the individual code lines have been established, allows for a communication method by simply laying down or inserting the cubes according to the rules necessary for the message describing configuration.

As individual code carrier means can furthermore function rectangular beltlike contraptions on which the six basic colors have been marked in evenly divided spaces. Rotating over stationary support pieces in combination with other such contraptions it is possible to form rows of them one beside the other in a plurality necessary for the Krempel Code principle to work as a communication method.

There exists of course also the possibility of relaying messages through the Visual Communication System on the control panel and computer screen by displaying the different color markings electronically.

BRIEF DESCRIPTION OF THE DRAWINGS

FIG. 1 illustrates an indicated board or tray device.

FIG. 2 illustrates a sample cube with color markings, first semiview.

FIG. 3 illustrates a sample cube with color markings, second semiview.

FIG. 4 illustrates a rectangular beltlike color selector, side view.

FIG. 5 illustrates a stationary support piece for beltlike color selector.

FIG. 6 illustrates a side view depicting innards of the stationary support piece with belt transport roller contraption.

DESCRIPTION OF THE PREFERRED EMBODIMENT

The relaying of messages is an important fact of our life. First it could only be accomplished by speech alone. Thence followed expressions like signals and drawings to communicate with each other. Whereafter came the written word as the main tool to educate, inform, impress or simply to help entertain all of us able to read and write.

As the next step in the communication progress of relaying messages the highly motivating but also easily comprehensible Visual Communication System method of the Krempel Code came along which replaces the letters of the common alphabet completely with the employment of five colors in combination with a neutral background.

The range for the use of the Visual Communication System is truly limitless only being confined in our presently somewhat narrow state of mind comprehending the state of art which nevertheless can be expanded at any time to even greater accomplishments through the exploitation and management of the tools given to us.

Therefore only a small choice of the Visual Communication System Devices possibilities is at the present time purposeful to tell. Like in any learning process first comes the simple matter, later the complicated accomplishments.

For the Visual Communication System the indicated board or tray devices can function as downright easy tools which use gridlike markings laid down on a board or besides other means a divided lattice tray whereon the support can exist of upright guides, elevated screenlike grates as well as of other supportive gridlike mesh, perforations or trelliswork in simplified or accented form to accompany the message carrier means of the marked cubes for example.

On the sides of the board or tray to help form the individual code lines indication marks as guiding principles are laid down on the board itself or administered in an elevated fashion. They can even be fastened on a sectionalized frame casing or similar device holding the whole contraption together as a unit.

FIG. 1 depicts such an indicated board or tray device just mentioned in a simplified manner with a gridlike surface showing 17 square spaces in either direction for the placing of the colored cubes. The rim or border of the board or tray has marked the blank rows between the three lines as well as the center row of each line on all sides so that the board or tray can be utilized from any side.

FIGS. 2 and 3 are enlarged semiviews of the simple cube to be employed with FIG. 1 as the message carrier means in the Visual Communication System indicating that the top a=black/neutral, the side b=red, c=yellow, d=green, e=blue and the bottom f=orange. In order for the whole device, which may also be magnetic, to be complete 289 such cubes are required to fill all square spaces on the board or tray. But of course any other amount of cubes for other sizes of indicated boards or trays can be used. They might even be marked with glowing, reflecting colors or illuminated from within.

The simple cube just explained can even be enhanced by giving each edge a protuberant projecting rodlike rounded eave. Numerous advantages can be reached with such an appearance. First of all it increases the tumbling ability by retracting the main faces of the cube and thereby lessen the surface of friction. The sunken faces may be marked or painted differently from the eaves which can function, if covered with glowing or reflecting matter, as an illuminating source for the cube's main surface on which any markings can either be of an indented or flat nature as well as slightly elevated but lower than the even further protruding eaves. This method will greatly increase the viewing possibilities of the cubes marked main faces so that the cube might even be utilized in the dark. Furthermore the eaves permit a closer and tighter fit in any exact mode of operation.

FIGS. 4, 5 and 6 explain an additional device of how the six basic color markings can accomplish another method possible in the limitless range of expressions in the Visual Communication System of the Krempel Code.

FIG. 4 portrays a beltlike contraption in rectangular form, seen from the side, whereon in even sections again the 6 colors are marked; a=black/neutral, b=red, c=yellow, d=green, e=blue, f=orange, and which is meant to rotate over stationary support piece FIG. 5 permitting the selection of color to achieve the needed color combinations for the utilization of the Visual Communication System.

FIG. 5 shows the stationary support piece of which two might be employed for the inside of the belt to uphold the rectangular form. The hole in the center will accommodate the axle. Near the top and bottom of FIG. 5 in the open rounded space, located at the inside of the belt, fiber optics or similar devices for lighting purposes can be placed.

FIG. 6 details two FIG. 5 stationary support pieces seen sideways. On top and the bottom of them are two rollers over which the belt can roll effortless, either turned manually or if connected by power source. The shaded center piece portrays the axle as the stabilizer for the stationary support pieces of the rectangular beltlike color selector of which as many can be placed on the axle in a row as deemed necessary. The axles, one beside the other, are fastened in sectionalized frame casings laid either flat or hung in an upright position.

Besides all of this exists of course the possibility to display any message carrier means on the computer screen whereof the Krempel Code of the Visual Communication System is no exception. It will be a great way to further an outstanding, beautiful and simple to understand manner of communication.

Naturally of course modifications of the just described, detailed and referred to invention Visual Communication System Devices can occur to those skilled in the field of the state of art. As for the true scope of the invention reference should also be made to the appended claims which are intended to extend and further the knowledge of the exceptional qualities necessitated by the Krempel Code as the basis for the foundation of the Visual Communication System.

I claim:

1. A visual communication system comprising;
   a board covered with a gridlike surface marked on its face so that each side of said board contains an equal number of squares, the edges of said board depicting markings designating groups of square locations, and
   a plurality of information carrier means to be mounted on said board, each of said information carrier means having a plurality of surfaces, each surface of one of said means being of a different color,
   the information carrier means being positioned on a particular square with a particular color surface uppermost, such that the combination of square location and color surface designates a specific alphabet letter according to a predetermined code.

2. The device of claim 1, wherein the information carrier means comprises a cube.

3. The device of claim 2, wherein the cube edges are protuberant projecting rodlike rounded eaves for the purpose of elevating the marked faces of said cubes from the surface whereby any markings can be of an indented, flat or elevated nature, furthermore the rounded edges of said cubes while decreasing friction resulting in increased tumbling ability.

4. The device of claim 1, wherein the information carrier means comprises a rectangular belt-like color selector divided into colored sections designated to rotate over stationary support pieces fitted with rollers for effortless rotation of the belt and center opening to accommodate the axle on which a designated number of said belt-like color selectors can be placed in a row; whereupon a plurality of said rows may be placed into a sectionalized frame casing to result in a surface made up of the top color sections of said rectangular belt-like color selectors.

* * * * *